(No Model.) 2 Sheets—Sheet 1.

J. B. VOGEL.
DECORTICATING MACHINE.

No. 373,161. Patented Nov. 15, 1887.

WITNESSES:
Gustave Dieterich
F. F. Bourne

INVENTOR
John B. Vogel
BY
Briesen & Steele
ATTORNEYS (No Model.) 2 Sheets—Sheet 2.

J. B. VOGEL.
DECORTICATING MACHINE.

No. 373,161. Patented Nov. 15, 1887.

WITNESSES:
Gustave Dieterich
T. F. Bourne

INVENTOR
John B. Vogel
BY
Briesen & Steele
ATTORNEYS

UNITED STATES PATENT OFFICE.

JOHN B. VOGEL, OF NEW ORLEANS, LOUISIANA.

DECORTICATING-MACHINE.

SPECIFICATION forming part of Letters Patent No. 373,161, dated November 15, 1887.

Application filed February 3, 1887. Serial No. 226,452. (No model.)

*To all whom it may concern:*

Be it known that I, JOHN B. VOGEL, a resident of New Orleans, parish of Orleans, State of Louisiana, have invented an Improved Decorticating-Machine, of which the following is a full, clear, and exact description, reference being made to the accompanying drawings, in which—

Figure 1:
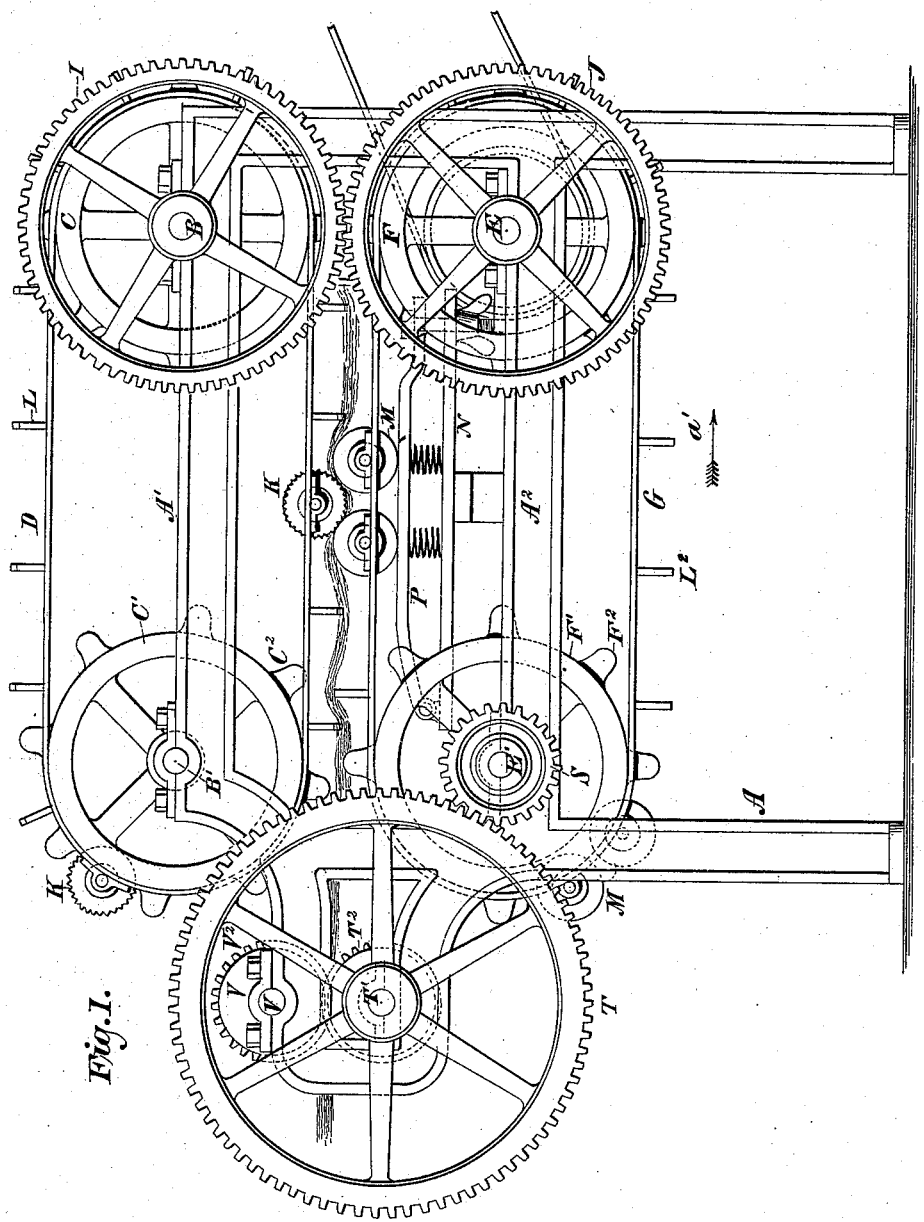
Figure 2:
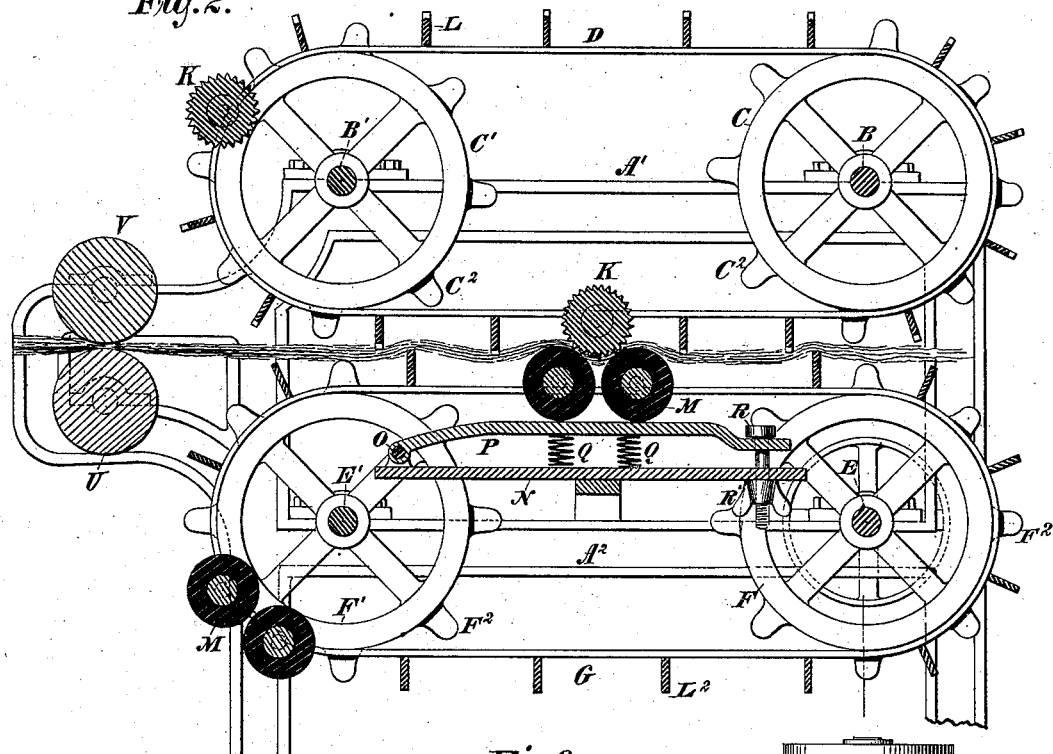
Figure 3:
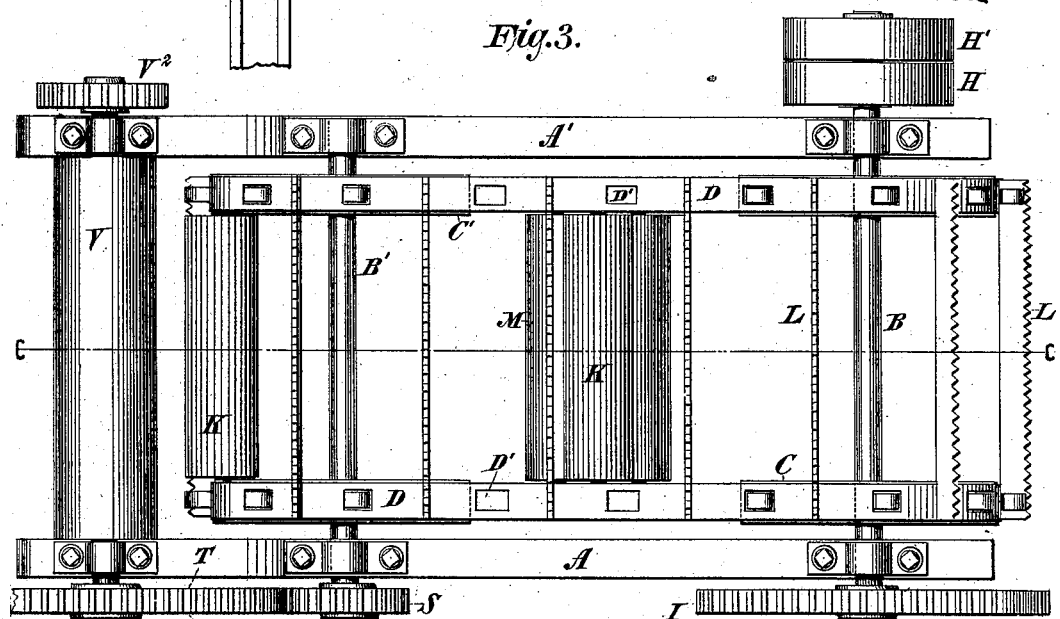

Figure 1 is a side elevation of my improved decorticating-machine. Fig. 2 is a longitudinal vertical section on the line C C, Fig. 3; and Fig. 3 is a plan view of my machine.

This invention has for its object to produce a machine for decorticating fiber in such a manner that the fiber shall be crushed and scraped and dragged most effectively.

The invention consists in providing upper endless belts or chains with revolving and other serrated scrapers, and lower belts or chains provided with revolving and other smooth-surfaced scrapers, which are arranged to act against the fiber, for crushing and removing the portion of the fiber not desired and leaving the filament, and means for feeding the fiber to the scrapers at a slower speed than the scrapers move, as will be more fully hereinafter set forth.

A is the frame of my improved decorticating-machine. Journaled in this frame are the shafts B B', carrying the two pairs of sprocket-wheels C C'. An endless chain, D, is passed around each upper pair of sprocket-wheels C C', said chain being constructed to be carried along by said sprocket-wheels C C'. Journaled in the lower part of the frame A are shafts E E', carrying sprocket-wheels F F', over which are placed and by which are carried chains G. The chains G are beneath the chains D.

On the end of the shaft B, outside of the frame A, are attached the fast and loose pulleys H H', over which may pass a belt for driving the machine; but other means may be employed for the same purpose, if desired. On the other end of the shaft B is fastened the spur-wheel I, which meshes with the spur-wheel J on the shaft E. These spur-wheels are of the same size and contain the same number of teeth, to impart equal speed to the sprocket-wheels and chains. On the outer edge of the belts or chains D are journaled one or more cylinders, K, which have serrated or smooth surfaces, and following these cylinders, and attached to the belts or chains D, are a series of cross-bars or scrapers, L, which have teeth cut upon their outer edges. On the lower belts or chains, G, are journaled one or more pairs of rollers or cylinders, M, having plain or serrated surfaces, which may be covered with rubber or analogous substances, and following these rollers or cylinders, and attached to the chains G, are cross-bars L², which have, by preference, plain edges. Each pair of upper and lower chains is so arranged and the rollers and cross-bars so attached to the chains that one upper serrated roller or cylinder K will pass into the recess formed between the pair of lower rollers, M, on the chain G as the chains move forward, and the cross-bars of each pair of chains will alternate—that is to say, one plain cross-bar on one chain will be between two toothed bars on the other chain, or vice versa.

Attached to the frame and between the sprocket-wheels F F' is a presser-board composed of the fixed lower board, N, to which is hinged at O the curved upper board, P. Between these two boards are placed springs Q. Through the free ends of the boards N and P is passed a threaded bolt, R, upon one end of which a thumb-screw, R', or other suitable adjusting devices, may be placed.

On the outer end of the shaft E' is attached a pinion, S, which meshes with the spur-wheel T, journaled in frame A, upon the shaft of which is mounted one pair of feed-rollers, U. Upon a shaft, V', journaled in the frame A, and above shaft T' of wheel T, is mounted a roller, V, corresponding to the roller U. Upon the shaft T' is attached a gear-wheel, T², which meshes with a gear-wheel, V², on shaft V'.

I do not wish to limit myself to the precise construction herein shown of arranging the scrapers, for it is evident that by placing the serrated revolving scrapers in pairs and the smooth-faced revolving ones singly the same result will be obtained; also, the smooth and serrated faced cross-bars may alternate on the chains—that is to say, one serrated cross-bar may follow one smooth-faced cross-bar, and so on round the chain—without departing from the spirit of my invention.

The operation is as follows: The machine being started, the chains move in unison in the direction of the arrow $a'$ in Fig. 1. The pinion S, meshing with the wheel T, revolves the same, but somewhat slower than itself. The fibrous matter is fed into the machine between the feed-rollers U V. It then passes between the chains D and G to the action of the rollers and cross-bars on said chains. As the chains move faster than the fiber, the upper or toothed cross-bars remove the crushed pith and woody matter, the lower cross-bars acting as scraping-knives. The upper roller or cylinder acts on the fibrous matter by pressing the same between the rollers M M'. These rollers M run upon the upper spring-board, P, which presses them toward the rollers K above them. The distance between these two rollers M and the upper roller, K, is regulated by means of the thumb-screw R'. In passing over the spring-board the rollers M revolve, thereby causing the upper roller to revolve, and by this means the fiber is crushed and rubbed, and, as the rollers move faster than the fiber, breaks and drags the same. The decorticated fiber then passes out of the machine, and is removed by falling on an apron or other suitable receiver.

Having now fully described my invention, what I claim is—

1. A decorticating-machine carrying rotary and stationary scrapers upon endless belts or chains, substantially as described.

2. In a decorticating-machine, an endless belt or chain carrying rotary and transverse scrapers having toothed or serrated surfaces or edges, in combination with an endless belt or chain carrying rotary and transverse scrapers having smooth surfaces or edges, substantially as described.

3. In a decorticating-machine, endless belts or chains carrying rotary and transverse serrated and smooth-faced scrapers, and mechanism for moving the scrapers faster than the fiber is fed into the machine, substantially as described.

4. In a decorticating-machine, the endless belts or chains carrying transverse serrated and smooth-faced scrapers, and means for adjusting the rotary scrapers of one chain with reference to the rotary scrapers of the other chain, substantially as described.

5. In a decorticating-machine, the sprocket-wheels C C', carrying endless belts or chains D, provided with rotary and transverse scrapers, in combination with sprocket-wheels F F', carrying endless chains or belts G, provided with rotary and transverse scrapers, and means for revolving the sprocket-wheels in unison, substantially as described.

6. In a decorticating-machine, a series of sprocket-wheels carrying endless belts or chains provided with rotary and transverse scrapers, and means for driving said sprocket-wheels in unison, in combination with pinion S, spur-wheel T, and feed-rollers U V, for feeding fiber to the machine with less speed than the scrapers move, substantially as described.

7. Sprocket-wheels C C' and F F', driven in unison, endless belts or chains D and G, passing over said sprocket-wheels and carrying serrated or smooth-faced scrapers, and spring presser-board P, for adjusting the serrated and smooth-faced rotary scrapers with reference to each other, in combination with the pinion S, spur-wheel T, and feed-rollers U V, substantially as described.

JOHN B. VOGEL.

Witnesses:
ANDREW HERO, Jr.,
JNO. I. WARD.